V. L. DUHEM.
MOVING PICTURE CAMERA AND PROJECTION MACHINE.
APPLICATION FILED MAY 4, 1911.

1,039,501.

Patented Sept. 24, 1912.

Witnesses,
R. S. Berry
Thos. Eastberg

Inventor:
Victor L. Duhem
By G. H. Strong
His Atty.

UNITED STATES PATENT OFFICE.

VICTOR L. DUHEM, OF OAKLAND, CALIFORNIA, ASSIGNOR TO AMERICAN VIMOGRAPH COMPANY, A CORPORATION OF ARIZONA.

MOVING-PICTURE CAMERA AND PROJECTION-MACHINE.

1,039,501.

Specification of Letters Patent.

Patented Sept. 24, 1912.

Application filed May 4, 1911. Serial No. 624,957.

*To all whom it may concern:*

Be it known that I, VICTOR L. DUHEM, a citizen of the United States, residing at Oakland, in the county of Alameda and State of California, have invented new and useful Improvements in Moving-Picture Cameras and Projection-Machines, of which the following is a specification.

This invention relates to moving picture machines, and particularly pertains to a mechanism for operating the ribbon film therein, both in a camera and in a projection machine.

It is the object of this invention to produce a camera for photographing moving objects for the production of motion pictures.

Another object is to provide a means for causing a ribbon of film to travel continuously from one reel onto another, which means includes a simple mechanism for giving the film a reciprocating movement in conjunction with and during its constant travel, so as to cause it to intermittently assume a stationary relation to a fixed lens at a point adjacent the inner end thereof, but at the same time continue its movement from one reel to the other.

The purpose of this invention is to provide a means by which the film will be stationary in relation to the lens when the shutter is open and yet be in constant motion, thereby doing away with the intermittent, or stop and start movements commonly employed, and which cause considerable wear and tear on the film ribbon, and usually necessitate the use of a multiplicity of parts.

The principal advantage of this invention lies in its fewness of parts, which are simple in construction and not liable to get out of order.

The invention consists of the parts and the combination and construction of parts as hereinafter more fully described and claimed, having reference to the accompanying drawings, in which—

Figure 1:
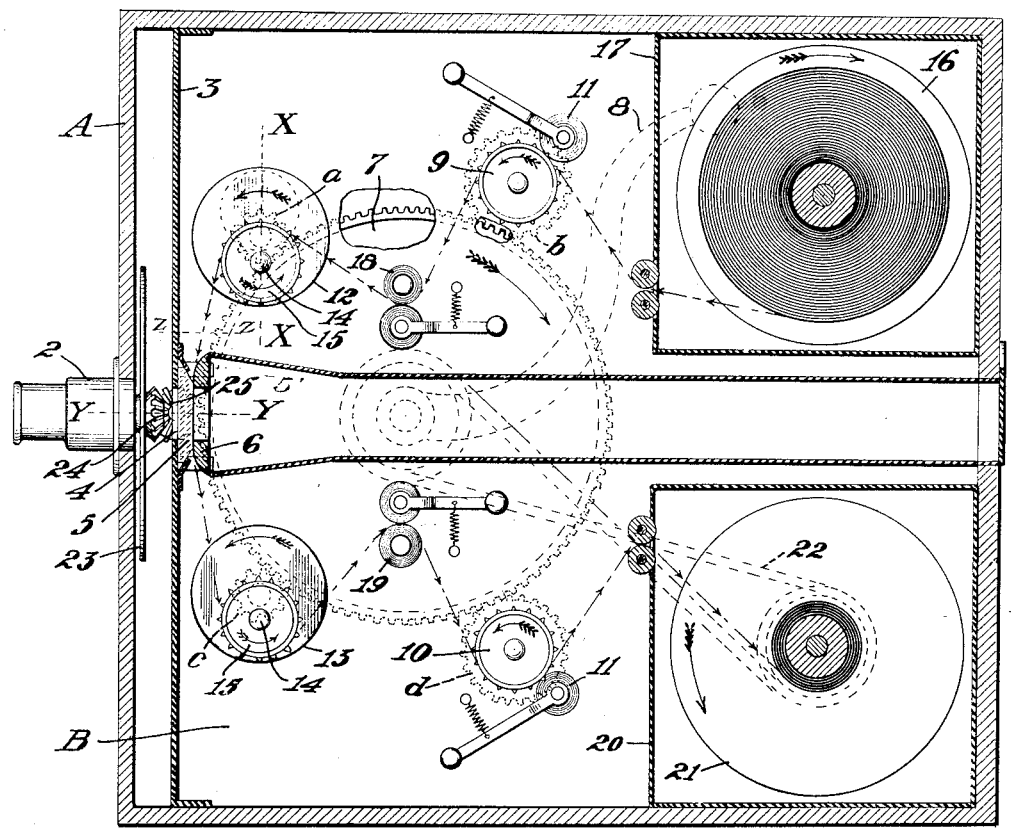
Figure 2:
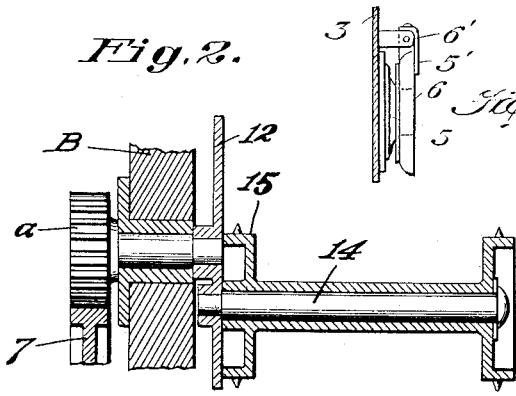
Figure 3:
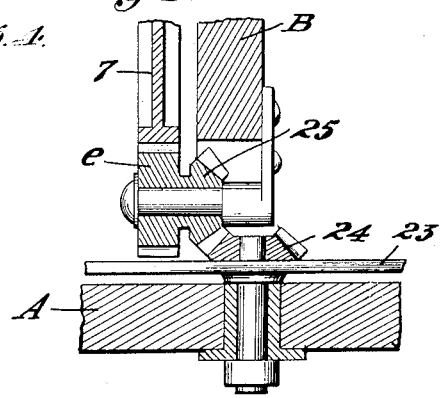

Figure 1 is a vertical section of a moving picture camera showing the invention as applied. Fig. 2 is a detail section on the line X—X, Fig. 1. Fig. 3 is a detail section on the line Y—Y, Fig. 1. Fig. 4 is a detail section on the line Z—Z, Fig. 1, showing the mounting of the gate.

In the drawings, A represents a camera case of any suitable construction, on which a lens 2 is mounted, and 3 is a transverse partition in the case A disposed thereacross a short distance from the inner end of the lens 2, and having an opening 4 registering with the lens, and which is covered by a transparent plate 5 mounted on the inner side of the partition.

A gate 6 is hingedly mounted at 6' on the partition 3 and is adapted to be closed against the inner face of the plate 5 by means of a plate spring 5' to press a ribbon of film thereagainst, which film passes between the plate 5 and the gate 6, as will be later described.

The camera case A is also provided with a partition B which extends longitudinally thereof at right angles to the partition 3, and revolubly mounted on the exterior of this partition B is a master-gear wheel 7 which is adapted to be rotated by means of a crank 8, indicated in dotted lines in Fig. 1, or in any other suitable manner. The gear 7 is meshed with a series of four pinions $a$, $b$, $c$ and $d$ shown in dotted lines in Fig. 1, which pinions are suitably disposed at intervals around the gear 7, and each pinion is mounted on a short shaft mounted in and extending through the partition B.

The shafts on which the pinions $b$ and $d$ are mounted have sprocket wheels 9 and 10, respectively, mounted on their inner ends, which sprockets are adapted to engage perforations on the outer edges of the film ribbon which is designed to pass thereover, an idler wheel 11 bearing against each of the sprockets wheels 9—10 to prevent the film jumping off the sprockets when in motion.

Mounted on the inner ends of the shafts on which the pinions $a$—$c$ are mounted, are disks 12—13, and mounted on the outer face of each disk is a pin 14 disposed eccentric to the center of the disk on which a sprocket wheel 15, corresponding to the sprocket wheels 9—10, is revolubly mounted.

The film on which the photographic impressions are to be made is wound on a reel 16 mounted in a film-box 17 arranged in the camera case A, and is fed from the box 17 over the sprocket 9, under a direction roller 18, over the sprocket 15 on the disk 12, thence between the plate 5 and the gate 6 and around the sprocket 15 on the disk 13, over a direction roller 19, under the sprocket 10, and into a film box 20, where it is wound upon a reel 21, which reel is rotated by means of a resilient belt 22 from a pulley formed on the gear 7.

A rotary shutter 23 is mounted on the case A adjacent the inner end of the lens 2 and has a beveled pinion 24 formed thereon, which meshes with a beveled pinion 25 formed integral with a pinion $e$, which is constantly in mesh with the master gear 7.

The operation of this invention is as follows:—The film being roved over the various sprockets and direction rollers, as before described, from the reel 16 to the reel 21, the master gear 7 is rotated by means of the crank 8, which causes the pinions $a$, $b$, $c$, $d$ and $e$ to rotate and revolve the respective parts connected therewith; the pinion $b$ rotating the sprocket 9 to feed the film from the reel 16 to the sprockets 15, and the pinion $d$ rotating the sprocket 10 to take up the film and deliver it to the reel 21 upon which it is wound by the action of the belt 22. As the rotation of the gear 7 and pinions $b$—$d$ is constant, it will be seen that the movement of the film from one reel to the other will be continuous. The pinions $a$—$c$ also rotate as the master gear 7 revolves, and rotate the disks 12—13 therewith, which disks carry the idler sprockets 15. These sprockets 15 being mounted eccentric to the center of the disks 12—13 are caused to move in a circle in unison, which movement acts to give the traveling length of film, passing between plate 5 and gate 6, between the sprockets 15, a reciprocating movement, the length of the stroke of which movement is approximately one third the height of a picture. From this it will be seen that by proportioning the pinions $a$—$c$ to the gear 7 so that the speed of the reciprocal movement of the film will be equal to the speed of travel of the film when the reciprocal movement is in a direction opposite that of the direction of travel of the film, the film will be stationary in relation to the lens 2, and when the reciprocal movement is in the same direction as that of the travel of the film, the speed of the film in relation to the lens will be double that of the normal speed of the film at a point adjacent the reels 16 and 21. The pinion $e$ is so proportioned in relation to the gear 7 as to rotate the shutter 23 one complete revolution during one complete reciprocation of the film, and the shutter 23 is provided with an open space so arranged as to expose the film to the light when the film is stationary in relation to the lens, the shutter cutting off the light from the film when the film moves in relation to the lens. By this arrangement a series of successive exposures may be made on the film while it is in continuous movement from one reel to the other.

From the foregoing it will be seen that the film may be wound in either direction, as desired, the belt 22 being shifted to the reel 16 when the film is to be wound from the reel 21. This permits of the direction of travel of the film being reversed at any time.

It is obvious that while I have shown and described the invention as applied to a camera, it is equally applicable for use on projecting machines, reproducing machines, and in any apparatus where it is desired to give a ribbon an intermittent movement in relation to a fixed point.

Having thus described my invention, what I claim and desire to secure by Letters-Patent, is—

1. The combination with a lens, shutter and a movable film, means for passing the film step by step across the lens, said means including eccentrically mounted rollers over which the film travels.

2. The combination with a lens and shutter, of a continuously moving film, and means by which the section of the film traversing the lens will have alternate periods of rest and intermediate periods of accelerated movement, said means including eccentric guides for the film.

3. The combination with a lens and shutter, of a continuously moving film, means by which the section of the film traversing the lens will have alternate periods of rest and intermediate periods of accelerated movement, said means including eccentric guides for the film, and means for rotating said eccentric guides continuously.

4. The combination with a lens, of a rotary shutter, a film adapted to be wound from one reel on to another reel, means for feeding the film continuously, eccentrically mounted guides around which the film passes for feeding the film intermittently across the lens, and a master gear for operating said several film feeding means and the shutter in unison.

5. In a camera or projector, the combination with a lens, a movable film, of means for winding said film continuously from one reel on to another reel, means whereby the film will be given a reciprocal movement synchronous with its continuous winding movement, said means embodying a pair of revoluble disks, and an idler roller mounted on each disk eccentric to the axis of rotation thereof.

6. In a camera or projector, the combination with a lens, a movable film, of means for winding said film continuously from one reel on to another reel, means whereby the film will be given a reciprocal movement synchronous with its continuous winding movement, said means embodying a pair of revoluble disks, an idler roller mounted on each disk eccentric to the axis of rotation thereof, and means for rotating said disks in unison, said means consisting of a master gear.

7. In a camera or projector, the combination with a lens, a movable film, of means for winding said film continuously from one reel on to another reel, means whereby the film will be given a reciprocal movement synchronous with its continuous winding movement, said means embodying a pair of revoluble disks, an idler roller mounted on each disk eccentric to the axis of rotation thereof, means for rotating said disks in unison, said means consisting of a master gear, and means for operating a shutter from said master gear to open the lens while the film is being reciprocated in a direction opposite its normal direction of travel and close the lens while the film is being reciprocated in the same direction as that of its normal travel.

8. A film moving mechanism including a pair of revoluble disks, idler sprockets revolubly mounted on said disks, eccentric to the center of said disks, and means for rotating said disks in unison.

9. A film moving mechanism, including a pair of revoluble disks, idler sprockets revolubly mounted on said disks, eccentric to the center of said disks, means for rotating said disks in unison, and means for feeding a ribbon of film to and from said idler sprockets.

10. A film moving mechanism including a pair of revoluble disks, revoluble members mounted on said disks eccentric to the axis of rotation thereof, and means for rotating said disks in unison, said means consisting of a master gear and pinions mounted on said disks meshing therewith.

11. A film moving mechanism including a pair of revoluble disks, revoluble members mounted on said disks eccentric to the axis of rotation thereof, and means for rotating said disks in unison, said means consisting of a master gear and pinions mounted on said disks meshing therewith, and means operated by said master gear for feeding a ribbon of film to and from said revoluble members.

In testimony whereof I have hereunto set my hand in the presence of two subscribing witnesses.

VICTOR L. DUHEM.

Witnesses:
   CHARLES EDELMAN,
   C. C. COOK.